July 24, 1956  A. FREEMAN  2,755,908
CONVEYOR SYSTEM
Filed May 7, 1953  3 Sheets-Sheet 1
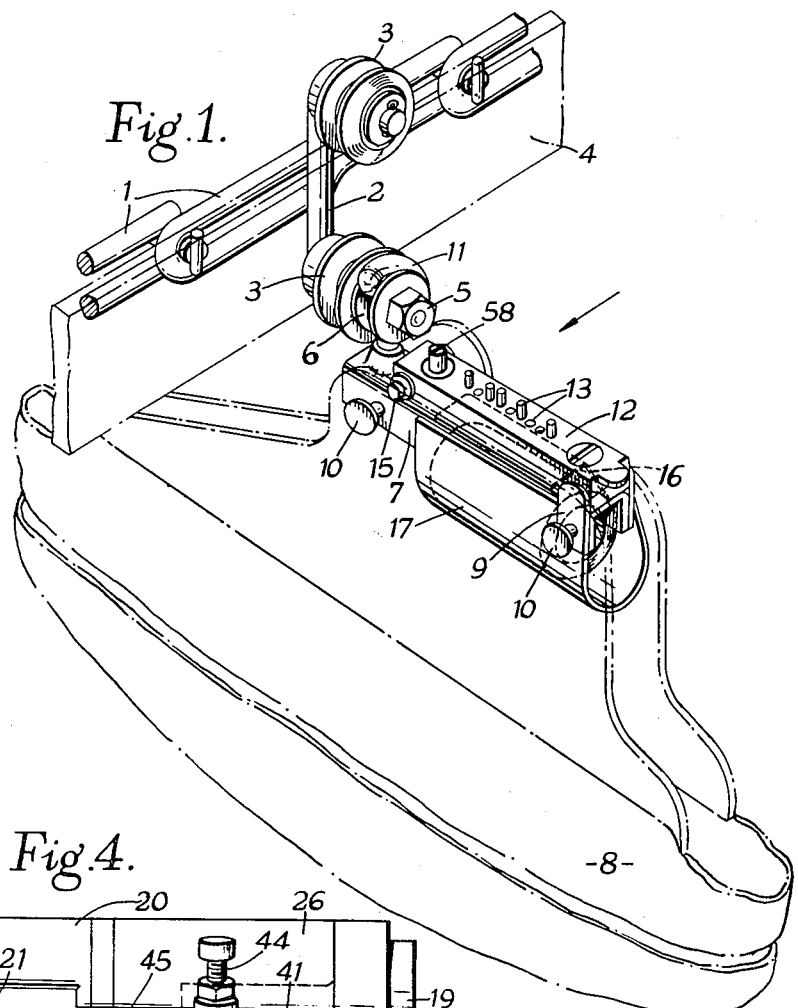
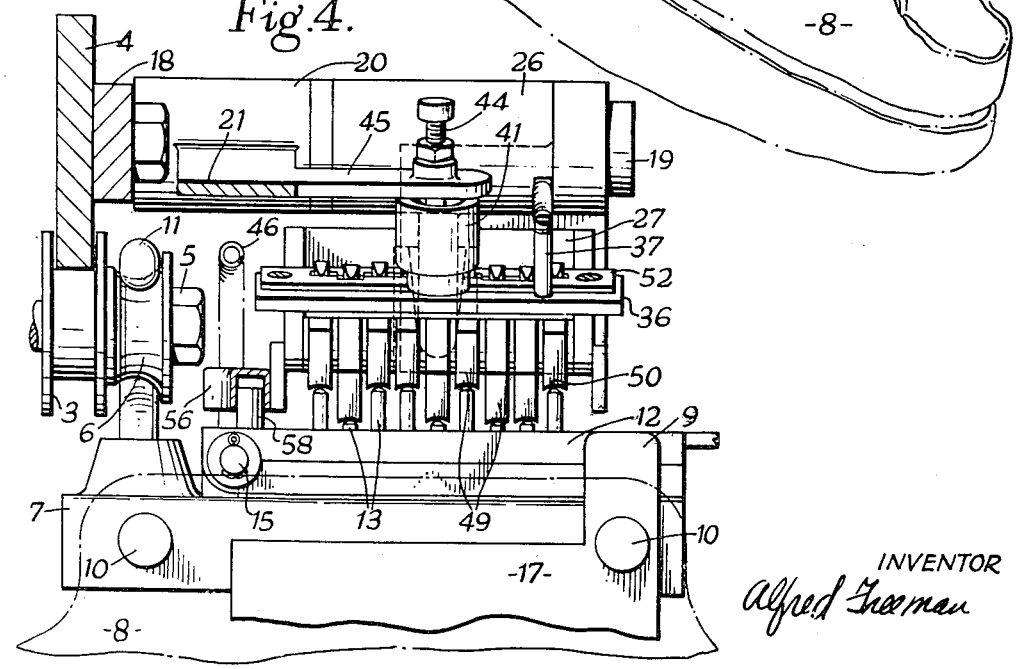
INVENTOR
Alfred Freeman INVENTOR
Alfred Freeman July 24, 1956

A. FREEMAN 2,755,908

CONVEYOR SYSTEM

Filed May 7, 1953

INVENTOR
Alfred Freeman

United States Patent Office 2,755,908
Patented July 24, 1956

2,755,908

CONVEYOR SYSTEM

Alfred Freeman, Isham, near Kettering, England

Application May 7, 1953, Serial No. 353,491

Claims priority, application Great Britain May 9, 1952

7 Claims. (Cl. 198—38)

The present invention is concerned with conveyor systems by means of which goods can be transported and delivered or dealt with automatically at a predetermined place along the system, as selected by the loader or chosen automatically.

In the specifications of my patent applications Nos. 294,400, 331,629 and 331,630, I have described various forms and features of conveyor systems whereby goods transported on the systems can be automatically discharged or otherwise dealt with at pre-selected stations en route.

The present invention is concerned with conveyor systems of this character and which essentially comprise a conveyor for transporting goods, a plurality of index devices which are permanently or detachably secured to the conveyor in association with particular goods or batches of such goods and each comprise a set of elements which can be "projected" or "retracted" to identify a particular combination, and a plurality of reader mechanisms which are sited at various positions along the conveyor and which are each responsive to a particular index setting so as to select an index device exhibiting that combination and accordingly to trip means acting on the goods associated with that particular device. Hereinafter conveyor systems of this character are referred to as being "of the character set forth."

The present invention is more particularly concerned with the reader mechanisms used in systems of the character set forth, and provides such a mechanism comprising a member carrying a catch or other trip means and movable between positions in which the trip means is operative and inoperative, and a plurality of movable elements governed by the setting of the index devices passing with the conveyor, said elements being arranged to cooperate with apertures in, or associated with, said movable member so that when, and only when, the elements of a passing index device are set to an approved combination of projections and retractions, the movable member will be adjusted to bring the trip means into its operative position.

In a preferred form of the reader mechanism the movable member, which may conveniently take the form of a plate, is mounted for rocking, and the movable elements are arranged side by side across the path of travel of the index devices and are individually rockable, under the dictation of the correspondingly transversely positioned elements of passing index devices to seek the corresponding aperature, such that the movable member will only be permitted to rock and bring the trip means into its operative position in the event that all the said movable elements finds and passes through an aperture.

Advantageously, moreover, I employ a set of movable elements all of like form, and I mount them on a common pivot so as to be individually rockable thereon, each of these fingers carrying a projection which, depending on the position of the finger concerned, will alternatively pass through a corresponding said aperture or will bear against the movable member, or a part connected thereto and provided with said apertures, so as to prevent it from bringing the trip means into the operative position.

As will therefore be understood, the projection "up" or retraction "down" of the corresponding index element will determine whether or not the lever nose or equivalent will enter its aperture and, with the use of a plurality of index elements, a considerable range of operating combinations can be applied.

In a suitable form, each finger is pivotally mounted to one side of its centre of gravity and carries a projection in the form of an upstanding pin disposed on the finger above the pivot thereof. Moreover each finger may be furnished at its underside with a groove for the guided passage of the tips of the corresponding index elements.

The form and arrangement of the receiving or selecting apertures in the "reader" member of this invention are also variable but conveniently, with aligned, side-by-side fingers, these apertures (one for each finger pin or equivalent) are made just large enough to accommodate one of these and each disposed in a forward or rear position, as regarded in the direction of travel of the conveyor. An aperture in the forward position will allow the passage of the pin or equivalent when the index element is "down," whilst when the element is "up" this pin will keep the reader member and trip means raised and inoperative, and with an aperture at the rear the reverse will apply. In carrying this arrangement into effect the sets of forward and rear apertures will preferably be arranged immediately above the axis of pivoting of the respective pin (which may conveniently be a common spindle) and the pins themselves be rockable by their fingers in the vicinity of the apertures.

The movable reader member may be a pivotally mounted plate, bar or arm, in which the apertures referred to are provided. Furthermore these apertures can be formed in a plate detachably secured to the reader member, thus enabling the required combination to be set on the reader member by simply affixing or substituting an appropriately-apertured plate.

Again, the reader member may instead be conditioned by the securing thereto of an appropriately-punched card, this being for example clamped in a holder frame on the member, for instance on the pivoted plate thereof.

Hereinafter I shall describe a specific form of system embodying this invention, but it is to be understood that this is only one of numerous possible applications of the system and of the invention.

One embodiment of a conveyor system embodying the present invention is illustrated by way of example in the accompanying drawings, in which:

Figure 1 is a perspective illustration of a detail conveyor chain, showing the hooked attachment thereto of an index device and a work carrier.

Figure 4 is an end view of the mechanism taken on the line IV—IV of Figure 2, and in the direction of the arrows.

Figure 2:
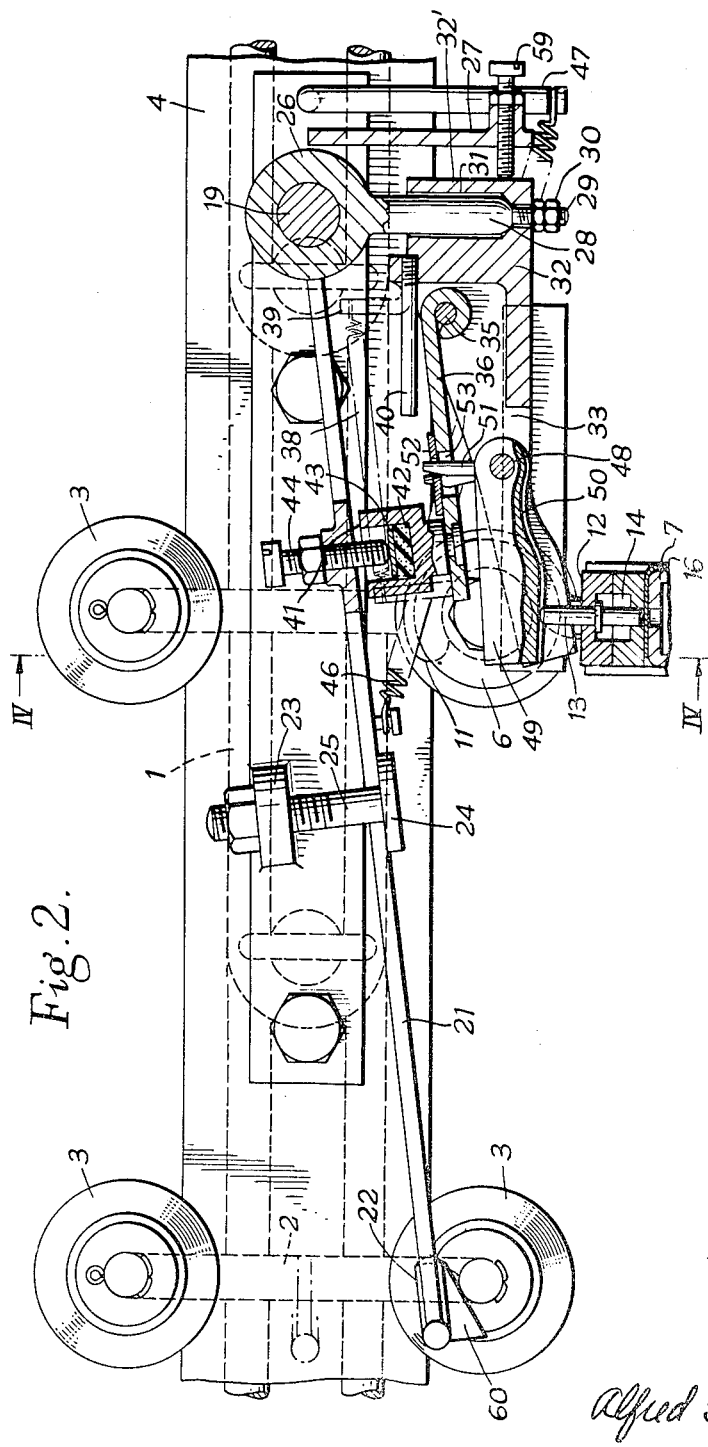
Figure 2 is a side view, with parts in vertical section on line II—II of Figure 3, of a reader mechanism disposed at a discharge station along the conveyor circuit, this view indicating the operation of the mechanism by an appropriately-set index device.

The arrangement illustrated is applied to an endless conveyor chain which is arranged to circulate through a work room in a boot and shoe factory (quoted merely as an example of the use of the invention) and in so doing passes a number of machines and operatives capable of performing different operations on the work. As will be understood, different types of shoes are manufactured in different ways or by different operations, or in some cases although the operation is in effect the same it is performed on different machines, so that the specific arrangement now to be described is adapted to enable the single conveyor to be used for routing the batches of work to different stations, i. e. by-passing some and stopping at others.

Thus the work is passed in a carrier from machine to machine and is automatically rejected from the conveyor at selected stations. The operator receiving a particular batch of work machines this batch, then replaces it in the carrier, sets the index combination of this carrier to the selected next station, and then hooks the carrier and its index device on the conveyor, whereafter these are automatically discarded at the selected next station or machine, and so on.

The conveyor chain used is of one of the link forms described in my Patent Application No. 329,340, i. e. is made up of links 1 of hairpin form with a cross piece 2 which is outturned at each end and serves to carry at each of these parts a roller 3 by means of which it is guided and supported on a rail track 4.

In this particular case, however, the lower outturned limb of the cross piece 2 of selected links arranged at intervals along the chain is extended somewhat and has secured thereto, by means of a nut 5, an outer and non-rotatable roller 6 which is intended to form a mounting for the support 7 for a work carrier 8.

This support comprises a member of inverted channel form which is provided with upstanding lugs 9 at the outer end, and towards the other has the index device, to be referred to later, hingedly connected thereto on its upper side. The lugs 9 and the other end of the downturned limb of the channeled support 7, at each side of the latter, each carry an outstanding stud 10 for the attachment of the upper end of the work carrier 8 which, in this instance, takes the form of a flexible bag. This bag has buttonholes at its upper end for mounting on the studs 10, whereby the bag is carried in slung fashion from the support 7 and at the same time has its upper end or mouth temporarily closed.

At its inner end the inverted channel support 7 has a hook 11 upstanding from the top limb of the channel, this hook being so shaped that it fits in the groove in the non-rotatable roller 6, so enabling the support, index device, and work carrier to be quickly hooked on the chain for the purpose referred to above, then serving to suspend these members on the conveyor chain alongside and below the latter.

The index device is of a form described in application Ser. No. 331,630, i. e. is comprised of a barform housing 12 (conveniently made in two superimposed halves for ready access to its interior) which is provided internally with a chamber 14 and serves to receive an aligned set of index elements 13 in the form of pins each of which can be vertically adjusted up or down relatively to the housing, thus enabling the pins to be set to the required "combination." The index housing or bar 12 is pivoted at 15 to the upper side of the work carrier support 7 and at its outer end is arranged for quick-release fastening to the lugs 9, whereby the operator can set or adjust a punched card 16 between the index mechanism and support. In this particular instance, moreover, the channeled support 7 has a depending scroll 17 which is secured to one depending limb and serves to receive and hold a roll of punched cards during the use of the device. All these features are described in Patent Application No. 331,629.

Provided at appropriate stations along the conveyor are reader mechanisms for testing passing index mechanisms and, in appropriate cases, for rejecting the support, index device and work carrier concerned.

Each of these mechanisms has a bracket by means of which it is secured to the rail 4, this bracket comprising a plate 18 with a fixed rod 19 outstanding laterally therefrom across the path of travel of the successive index devices and having rotatable thereon a sleeve 20 carrying a forwardly-projecting arm 21 of bar form carrying, at its outer end, a trip means comprising a hook-form nose or pin 22. The latter is disposed in vertical register with the path of the hooks 11 of the work carrier supports and such that, when the free end of the arm 21 is tilted downwards, with the sleeve 20 rotating about the rod 19, the nose 22 will engage oncoming hook 11 and, by the consequent abutment, cause this to rotate on its curved seat on the fixed roller 6 until the hook 11, the support 7, and the carrier 8 attached thereto, drop off the roller 6, i. e. are rejected from the conveyor.

The uppermost and lowermost positions of the arm 21 are limited by stops provided by a lug 23 outstanding from the plate 18 and by the head 24 of a bolt 25 which is screwed into the lug 23 and provides for adjustment of the lower limit of travel of the arm 21, if so required.

The actual pivoting of arm 21 is controlled by the reading or sensing device proper which will now be described.

Mounted and pinned on the rod 19 is a fixed sleeve 26 carrying at its rear side a depending plate 27 and, at its underside, a spigot 28 which has a screw threaded extension 29 at its lower end carrying lock nuts 30. The spigot 28 passes, with all round play, through a bore 31 provided in a sleeve 32' of back plate 32 and downwardly tapered at the sides and thereby supports the reader plate and its associated parts in suspended fashion.

Hence, this back plate has a pair of forwardly-projecting side plates 33 which in turn fixedly carries a pair of opposed side cheeks 34. Mounted between the plates 33 is a transverse spindle 35 which forms a pivot for the reader plate 36 which is of squat T-shape. At its forward end the plate 36 is provided with an upstanding pin 37 to which is anchored one end of a tension spring 38 secured, at its other end, to an arm 39 carried by the back plate 32. This tension spring strives constantly to draw the forward end of the reader plate 36 upwards, and it will be noted that a stop 40 is secured in the back plate 32 to limit the extent of potential upward pivoting of the reader plate in this way.

In addition the reader plate carries at its forward end an upstanding, open-topped socket 41 with a rubber pad 42 seated in the base of the socket and surmounted by a wear-resistant washer 43, and entering this socket is a set screw 44 which passes through a lateral ear 45 on the arm 21. As a result, the arm 21, when tilted downwards, exerts pressure on the reader plate 36 so as to rock this downwards at its forward end, the arm 21 being normally urged into this position by a tension spring 46 anchored at one end to the underside of arm 21 and at its other end to a member 47 secured to, and depending from, the mounting plate 18.

Also disposed transversely between the side plates 33 is a second spindle 48 which serves as a common pivot for a set of feeler fingers 49 which are disposed side by side and are spaced from one another by an amount corresponding to the spacing of the index pins 13 of the various index devices. These fingers are all of like bar form and are each loosely pivoted on spindle 48 at their rear ends. Each finger, moreover, has at its underside a groove 50 for engagement with, and the guided passage of, an upstanding index pin. In addition it has, secured thereto, at its rear end, an upstanding pin 51 which co-operates with a plate 52 disposed transversely across a rectangular opening 53 in the reader plate 36 and detachably secured to this plate by means of screws 54.

Figure 3:
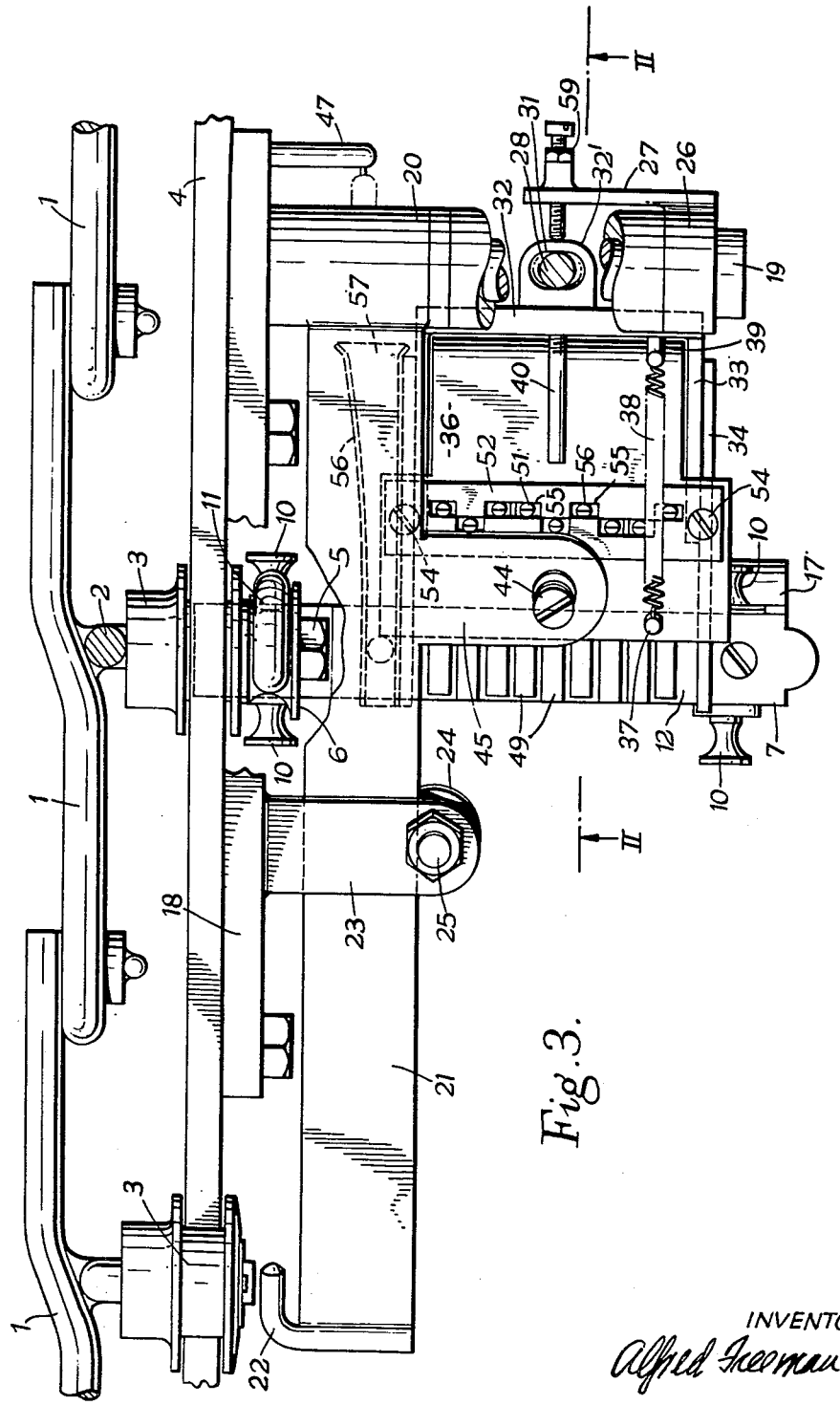
Figure 3 is a plan view of this mechanism with parts broken away.

As will be observed more particularly from Figure 3 of the drawings, the plate 52 is provided with apertures 55 each of sufficient size to permit the passage therethrough of the corresponding pin 51, each of the apertures being selectively disposed in a forward or rear position, regarded in the direction of travel of the conveyor, whereby the plate, in the majority of cases, will be seen to present two relatively-offset and interrupted rows of such apertures, according to the combination to which it is dedicated.

By virtue of the fact that they are pivoted on spindle 48 at their rear ends, the fingers 49 will tend to drop down under gravity at their forward ends, but the arrangement is such that the front edge of opening 53 in the reader plate will always prevent the fingers from dropping into the vertical status. If desired, however, the rear ends of each of the fingers could have a tail cooperating with a common fixed cross piece (not shown) secured between the side plates 33, for this purpose.

As will therefore be apparent, when an index device is brought into the zone of the fingers 49 the upstanding index elements 13 engage and lift their corresponding fingers whilst the retracted elements 13 leave the corresponding fingers tilted forwards, again as is apparent from Figure 2 of the drawings. If the resultant adjustment of the fingers 49 brings everyone of the pins 51 into register with a corresponding aperture 55 in the reader plate, the latter will be allowed to tilt forwards under the load applied thereto by the arm 21. This represents a setting of the index device correlated to the combination provided on the particular reader mechanism (which, it will be observed, can readily be changed by replacing plate 52). For any other combination, any pin 51 not finding an appropriately-positioned aperture 55 will bear against the underside of plate 52 and the reader plate 36 will not tilt forwards.

As will further be understood, apertures such as 55 may be provided by perforations in a punched card detachably secured to the reader plate, e. g. by a clamping frame.

The particular reader mechanism illustrated is also designed to provide for accurate relative positioning between the mechanism itself and oncoming index devices to preclude workshop inaccuracies, wear, and so on from interfering with the correct operation.

With this in view the side cheek 34 nearer the track rail 4 is equipped with an inverted guide channel 56 which is flared at its forward end 57 and cooperates with a stud 58 (see Figure 1) disposed at a corresponding part of the housing 12 of the index device. As can be clearly seen from Figure 4 of the drawings, the stud 58 is received in the guide channel 56 and this, by virtue of the allowance for lateral rocking of the reader mechanism by the pin and socket arrangement 28 and 31, ensures that the reader fingers are correctly disposed laterally at the moment when the "sensing" is to take place. In similar fashion, the loose mounting of the spigot 28 in socket 31 allows for the reader mechanism to be pivoted in a horizontal plane by the stud 58, if this is necessary. A set screw 59 carried by the plate 27 controls the displacement of sleeve 32'.

As will further be appreciated, the effect of the screw 44 acting on the reader plate 36 is normally to bias this plate downwards under the weight of the arm 21 and the load of spring 46, which would normally mean that the adjustment of pins 51 by the action of a passing index device would have to take place against this bias.

To avoid this, and thus to "sensitize" the operation of the mechanism, the arm 21 is provided at its outer end, adjacent the nose 22, with a chamfered element 60 which is adapted periodically to ride over laterally extending members (not shown) arranged at appropriate intervals along the conveyor chain. These intervals are selected so that the forward end of the arm 21 is lifted each time that an index device 12 passes beneath the feeler finger 49, with the result that, at this time, the reader plate 36 is relieved of the load indicated, thus facilitating the work to be performed by the fingers during their adjustment by the index element. When the projection in question has passed, the arm 21 is urged downwards again under the action of spring 46 and its own weight, and the screw 44 accordingly transmits this movement to the reader plate which, accordingly, will tilt forwards or not, according to whether an approved index device setting is passing or not.

In the affirmative case, the arm 21 will continue to descend, until it is held by the head 24 of bolt 25, this bringing the nose 22 into accurate alignment with the nose of the hook 11, with the result that the work carrier will be swung over, and discarded from the conveyor as described above. In this event, the chamfered piece 60 will co-act with a following part of the conveyor mechanism to restore arm 21 upwards, and the consequent release of load on the reader plate will enable this to be pulled up by its spring 38 and the fingers, thereby released, to reset in the forwardly-tilted condition.

In the event, on the other hand, that the index device does not have an approved setting, then the reader plate 36 will be unable to tilt forwards as indicated, and the arm 21 will only descend into an intermediate position at which the screw 44 abuts the pad 42, 43 in the socket 41, and no further, so that the nose 22 will not descend to the level of the oncoming hook 11, and the work carrier concerned will be allowed to pass.

The operation of the invention is as follows:

The index device 12 is set by inserting a punched card (Serial No. 331,630) in which holes are provided at positions 2, 5, 7 and 8 thus leaving pins in the positions 1, 3, 4, 6 and 9 upstanding from the device 12 as shown in Figure 1. Of course, the reader mechanism will respond to the particular pin setting mentioned above, and, the plate 52 having the cut-out areas therein is secured above the gap 53 in the reader plate 36. It will be appreciated that by the use of the separate plate 52, otherwise standard reader mechanisms can be adapted to the various different reader settings required.

The work is attached to the index device 12 by an operator who thereafter hooks the assemblage onto the conveyor chain 1 as shown in Figure 1, and, the assemblage travels with the chain until the assemblage reaches the reader mechanism which the pin arrangement of the index device is set to operate. When the assemblage reaches such reader mechanism, the index device passes beneath the latter (moving from right to left in Figure 2) and the upstanding pins of the index device 12 slide under the corresponding fingers (numbers 1, 3, 4, 6 and 9) and rock such fingers in an upward direction. Hence, the pins 51 on such fingers move into registry with the rear set of holes 56 in the plate 52, while the pins of the other fingers remain in registry with the forward set of holes, these holes being so described in relation to the direction of travel of the index device and work assembly.

As a consequence, the reader plate can, for the first time, tilt forward, the trip arm 21 follows the same and the stem is brought into line with the end of the bag hook 11, so that the index device and bag are pushed off the conveyor chain 1.

What I claim then is:

1. For a conveyor system including a conveyor for goods, and index devices with adjustable outstanding elements adapted to be carried with said conveyor, and a reader mechanism for the travelling index devices, such reader mechanism comprising a reader member furnished with apertures, trip means carried by said reader member, and a plurality of reader elements movable by projected passing index elements and positioned for cooperation with the apertures of said reader member, whereby the reader member is actuated to bring the trip means into operative position only when the various reader elements are moved into register with their corresponding apertures in the reader member.

2. For a conveyor system including a conveyor for goods, and index devices with adjustable outstanding elements adapted to be carried with said conveyor, and a reader mechanism for the travelling index devices, such reader mechanism comprising a rockably-mounted reader member furnished with apertures arranged in a preselected pattern, trip means carried by said reader member, and a plurality of rockably-mounted reader elements disposed in the path of the index elements of the successive index devices and each carrying an operating projection and adapted to be rocked by a corresponding projecting index element, whereby the operating projection of each reader element has alternative positions in which it registers with one of said apertures or with an imperforate portion of the reader member, in the second case to prevent this reader member moving said trip means into an operative position.

3. A reader mechanism according to claim 2, in which the reader elements are arranged side by side on a common spindle.

4. A reader mechanism according to claim 3, in which the reader elements each have an upstanding pin disposed above the pivot of its reader element.

5. A reader mechanism according to claim 2, in which each reader element is in the form a a bar-shaped finger pivotally mounted at one end and having a groove at its underside for the guided passage of corresponding index elements.

6. A reader mechanism according to claim 2, in which said apertures are formed in a sheet member detachably connected to the reader member.

7. For a conveyor system including a conveyor for goods, and index devices with adjustable outstanding elements adapted to be carried with said conveyor, and a reader mechanism for the travelling index devices, such reader mechanism comprising a frame, a reader plate pivoted on said frame and having a trip arm, and a plurality of individually-pivotable reader fingers mounted side-by-side beneath said plate and having a projecting pin cooperating with one of a set of pin-receiving apertures in said plate or a part connected thereto.

References Cited in the file of this patent

UNITED STATES PATENTS

| 2,315,659 | Russell | Apr. 6, 1943 |
| 2,328,317 | Wentworth | Aug. 31, 1943 |

FOREIGN PATENTS

| 396,635 | Great Britain | Aug. 10, 1933 |